United States Patent [19]

Fima

[11] 4,250,650
[45] Feb. 17, 1981

[54] INTERMITTENTLY ILLUMINATED FISHING LURE

[76] Inventor: Raoul G. Fima, 24901 Cienega La., Mission Viejo, Calif. 92675

[21] Appl. No.: 966,361

[22] Filed: Dec. 4, 1978

[51] Int. Cl.³ .............................................. A01K 75/02
[52] U.S. Cl. ...................................................... 43/17.6
[58] Field of Search ................................ 43/17.5, 17.6

[56] References Cited

U.S. PATENT DOCUMENTS

| | | |
|---|---|---|
| 2,217,565 | 10/1940 | Seigle et al. . |
| 2,329,790 | 9/1943 | Seigle . |
| 2,500,442 | 3/1950 | Waite . |
| 2,550,988 | 5/1951 | Flournoy . |
| 2,598,471 | 5/1952 | Waite .................... 43/17.6 |
| 2,709,868 | 6/1955 | Simmons . |
| 2,711,044 | 6/1955 | Woods . |
| 2,897,623 | 8/1959 | Flournoy . |
| 3,001,315 | 9/1961 | Zimmermann . |
| 3,213,562 | 10/1965 | Salvin et al. . |
| 3,308,569 | 3/1967 | Foellner et al. . |
| 3,535,812 | 3/1970 | Crecelius . |
| 3,721,033 | 3/1973 | Haynes . |
| 3,828,177 | 8/1974 | Day . |
| 3,940,868 | 3/1976 | Northcutt ................ 43/17.6 |
| 4,085,538 | 4/1978 | Jankowski . |

Primary Examiner—James G. Smith
Attorney, Agent, or Firm—Fulwider, Patton, Rieber, Lee & Utecht

[57] ABSTRACT

A fishing lure containing one or more light sources includes a guideway along which a battery rolls back and forth in response to an oscillatory movement of the lure. A series of spaced-apart stationary electrical contacts are positioned along the guideway to be successively engaged by the moving battery to intermittently complete a circuit and energize the light sources. The light sources are internally mounted for protection by the body of the lure and the light is transmitted to exterior locations by optical conductors.

9 Claims, 4 Drawing Figures

U.S. Patent  Feb. 17, 1981  4,250,650
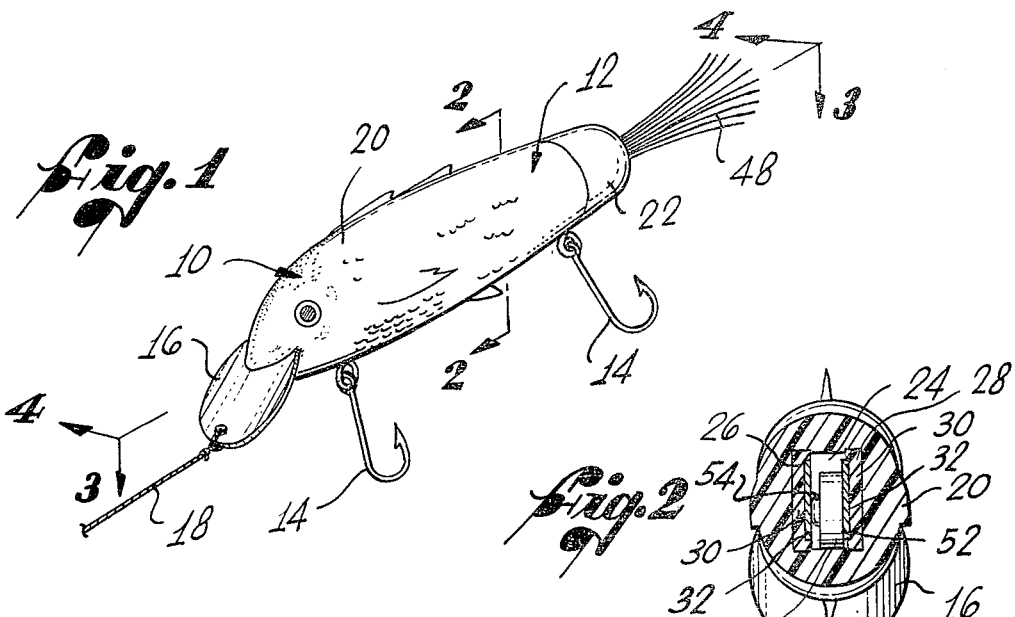
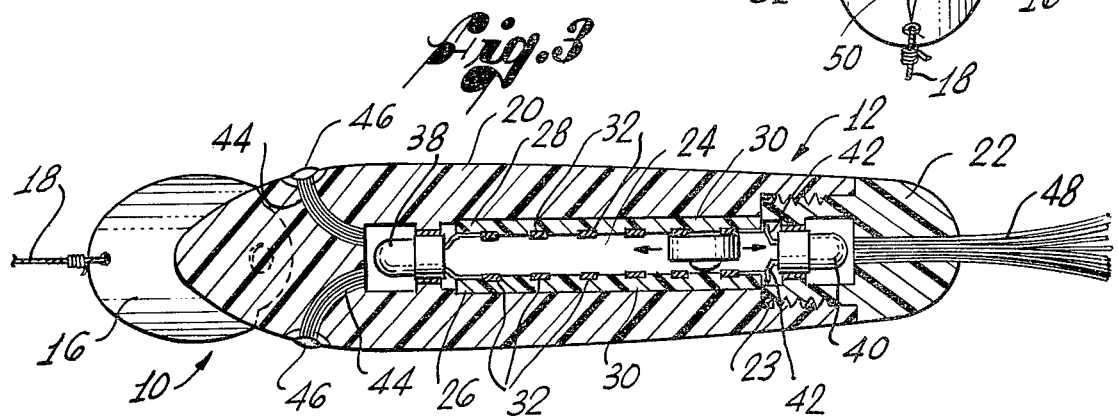
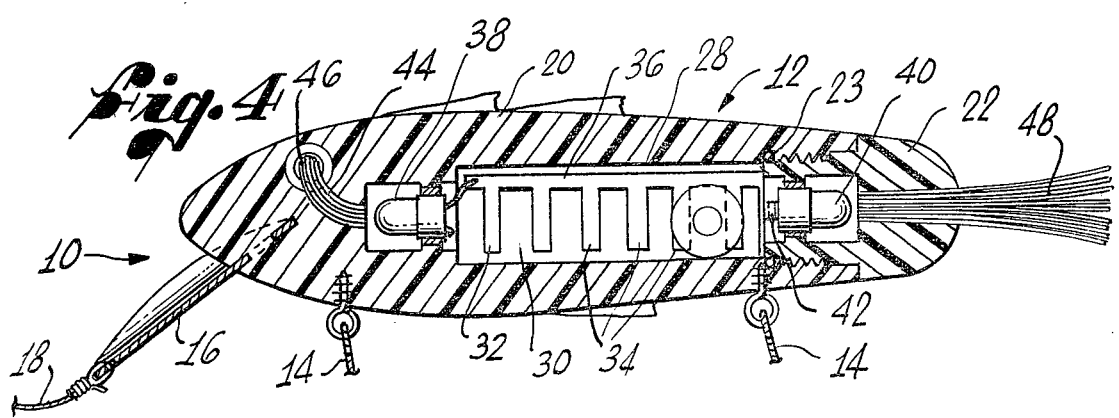

INTERMITTENTLY ILLUMINATED FISHING LURE

BACKGROUND OF THE INVENTION

The present invention relates to fishing lures and, more particularly, to illuminated fishing lures.

A variety of fishing lures have been proposed that are illuminated to take advantage of the natural attraction of fish to light. Many such lures have been unduly expensive and fragile.

Some illuminated lures have been constructed so that they flash in response to movement of the lure. These lures may flash with insufficient frequency and often have an awkward or unnatural overall appearance attributable to a relatively bulk flashing mechanism. Other lures have been proposed that flash in response to the resonance of a transistorized circuit, but the constant regularity with which they flash gives an artificial and suspicious appearance.

An objective of the present invention is to provide a new and improved illuminated lure that overcomes many disadvantages of the previously known lures.

SUMMARY OF THE INVENTION

The present invention is embodied in a fishing lure provided with a body that defines a guideway along which a series of stationary electrical contacts are arranged. As the lure oscillates, a movable contact travels along the guideway under the force of gravity to successively engage the stationary contacts, thereby completing a circuit to intermittently energize a light source. The movable contact can be a terminal of a battery.

Preferably, the lure is elongated in its direction of intended movement through the water with the guideway extending in the same direction so that a rocking movement of the lure causes the movable contact to roll back and forth. A plurality of stationary contacts can be arranged in a row along one side of the guideway with one or more contacts being positioned on the opposite side. The movable contact can then be dimensioned to simultaneously engage stationary contacts on both sides to complete the circuit.

The light source can be advantageously enclosed within the body of the lure where it is well protected from damage on impact and when it is attacked by a fish. Light conductors carry the light to one or more locations on the exterior of the lure.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a pictorial view of an illuminated fishing lure constructed in accordance with the present invention;

FIG. 2 is an enlarged cross-sectional view of the lure taken along the line 2—2 of FIG. 1;

FIG. 3 is an enlarged cross-sectional top view of the lure taken along the line 3—3 of FIG. 1; and FIG. 4 is an enlarged cross-sectional side view of the lure taken along the line 4—4 of FIG. 1.

DESCRIPTION OF THE PREFERRED EMBODIMENTS

A fishing lure 10, illustrated in FIGS. 1-4 of the accompanying drawings, includes many innovative features of the present invention, although it has a relatively conventional outward appearance, as shown in FIG. 1. It has an elongated body 12 of a generally fish-like shape with two fish hooks 14 attached at the bottom. At the front end of the body 12 is a spoon-shaped member 16 that extends downwardly and forwardly.

As the lure 10 is pulled through the water by a line 18, the spoon 16 causes the lure to have an oscillating movement. First, the action of the water against the spoon 16 pushes the front end of the body 12 down. Then, the resistance of the canted lure becomes too great and the front end rises with a relatively abrupt motion. This action of the lure is commonly used and is thought to be attractive to fish since it simulates the motion of a natural food source.

Most of the body 12 of the lure 10 is formed by a main section 20, with the exception of the tail end which is formed by a cap section 22 that is threadedly received by the main section, as best shown in FIGS. 3 and 4. An O-ring 23 seals the threaded interface in a watertight manner.

Extending longitudinally along the main section 20 (in the direction of intended movement of the lure 10 through the water) is an elongated guideway 24 of rectangular cross-section. Along each vertical side of the guideway 24 is a printed circuit board 26, 28. Each board 26, 28 consists of a flat, elongated, non-conductive plate 30 glued to the main body section 20. A comb-shaped conductive element 32 (preferably copper) is mounted on each plate to provide a row of spaced-apart vertical contacts 34 interconnected at their top ends by a strip 36. These contacts 34 are referred to as stationary contacts because they are not movable with respect to the body 12.

Two light sources 38 and 40 are enclosed within the body 12 of the lure 10, one being mounted at the head end of the main section 20 and the other in the cap 22. Preferably, the light sources 38 and 40 are light-emitting diodes (LEDs) which are small, require little current, and have a high life expectancy. Each light source 38, 40 is electrically connected across the two circuit boards 26 and 28, the head end source 38 being permanently wired to the boards and the tail end source 40 carrying two resilient, conductive prongs 42 that bear against the ends of the boards when the cap 22 is in place.

Two bundles 44 of light conducting optical fibers diverge from the head end light source 38 and lead to the simulated eyes 46 of the fish. A single bundle 48 of fibers leads from the tail end light source 40 out the rear of the body 12 and fans out to provide an attractive illuminated display. The use of light conductors not only enables one light source 38 to illuminate more than one exterior location but it protects the sources 38 and 40 from damage by attacking fish or objects that might be struck by the lure 10 when it is cast.

Power to energize the light sources 38 and 40 is provided by a disk-shaped battery 50 inserted in the guideway 24 between the boards 26 and 28. The two ends of the battery 50, which is of a conventional and readily available type sometimes referred to as a "button" battery, form terminals that serve as movable contacts. The battery 50 is dimensioned to simultaneously engage the stationary contacts 34 on both sides of the guideway 24 as it rolls on its circumferential edge.

One terminal end 52 of the battery 50 is flat and is always in engagement with at least one of the stationary contacts 34 while the opposite terminal is a small protrusion 54 (FIG. 2) that may be in engagement with one of the stationary contacts or may be located in the space between them, depending upon the precise position of the battery within the guideway 24. The circuit that powers the parallel light sources 38 and 40 is completed only when both battery terminals 52 and 54 are simultaneously in engagement with stationary contacts 34. The light sources are, therefore, energized intermittently as the battery 50 rolls back and forth within the guideway 24 under the force of gravity due to the rocking action of the lure 10.

It will be appreciated that the circuit board 28 adjacent the flat end 52 of the battery 50 need not include individual contact elements 34 but may instead be a single strip-like contact since it is always engaged by the battery. It is preferred, however, to use two similar circuit boards 26 and 28 to minimize the number of different components required to fabricate the lure 10.

The lure 10 embodies a simple and inexpensive yet very reliable mechanism that causes flashing of the light sources 38 and 40. It can be inactivated easily by unscrewing the cap 22 and removing the battery 50. The flash rate and the number of flashes that accompany each change of orientation is controlled by the number of individual contacts 34 and the distance between them. The light sources 38 and 40 can be caused to remain on or to remain off when the battery 50 is at rest at one end of the guide channel 24, depending upon whether there is a contact 34 positioned to be engaged by the battery at that location. Another potential advantage of the lure 10 is that the movement of the battery 50 produces a noise as it rolls along the guideway 24, clicking against the contacts 34 and hitting against the ends. These sounds call attention to the lure 10 and may help to attract fish.

The flashing of the lure 10 is not regular and continuous. Instead there tends to be a series of flashes each time the lure 10 changes its orientation in the water. Since the front end of the lure 10 usually rises more rapidly than it falls, successive series of flashes will have different flash rates. The irregular flash pattern produced tends to have a more natural appearance as compared to continuous flashing at a fixed rate and it is more attention-getting than less frequent flashes occurring only once on each change of orientation.

While a particular form of the invention have been illustrated and described, it will also be apparent that various modifications can be made without departing from the spirit and scope of the invention.

I claim:

1. In a fishing lure containing a light source and including means for producing oscillatory movement of said lure as it is pulled through the water, the improvement comprising:
   a guideway within said lure;
   a plurality of stationary electrical contacts disposed along said guideway;
   circuit means for connection said contacts to said light source; and
   a disk-shaped battery disposed within said guideway and adapted to roll therealong in response to said oscillatory movement, said battery including terminals adapted to engage said contacts and to thereby intermittently energize said light source as said battery moves along said guideway.

2. A fishing lure comprising:
   a body;
   at least one fish hook attached to said body;
   means for causing oscillatory movement of said body as it is pulled through the water;
   a light source carried by said body;
   a guideway defined by said body;
   at least one row of electrical contacts arranged along said guideway, each of said contacts being electrically connected to said light source; and
   a battery disposed within said guideway and movable therealong in response to said oscillatory movement of said body, said battery having a terminal arranged to successively engage said contacts as said battery moves along said guideway, whereby said light source is intermittently energized by said battery.

3. The fishing lure of claim 2 wherein said body is elongated in the direction of its intended movement through the water and said guideway extends in said direction of intended movement.

4. The fishing lure of claim 2 wherein said battery is disk-shaped and thereby adapted to roll along said guideway.

5. The fishing lure of claim 2 wherein:
   said body is elongated in the direction of its intended movement through the water and said guideway extends in said direction of intended movement;
   said lure including at least one additional contact disposed on the opposite side of said guidway from said row of contacts; and
   said battery is disk-shaped, being thereby adapted to roll along said guideway, and has a terminal on each end thereof.

6. The fishing lure of claim 2 wherein:
   said light source is enclosed within said body; and
   said lure includes at least one light conductor extending from said light source to the exterior of said body.

7. The fishing lure of claim 2 wherein:
   said light source is enclosed within said body; and
   said lure includes a plurality of light conductors extending from said light source to a plurality of separate locations on the exterior of said body.

8. The fishing lure of claim 2 wherein said body comprises a main section that includes said guideway and a cap section forming an end of said body that is threadedly attached to said main section, said cap section being removable to replace said battery.

9. A fishing lure comprising:
   a main body section having a head end and elongated in a direction in which it is intended to be moved through the water;
   a cap body section having a tail end and threadedly attached to said main body section to form an enclosed body;
   at least one fish hook attached to said main body section;
   means attached to said main body section to cause oscillatory movement of said body;
   a light source enclosed within said body;
   a plurality of light conductors leading from said light source to a plurality of separated locations on the exterior of said body;
   an interior guideway extending through said main body section in the direction of its elongation;

a row of spaced-apart electrical contacts arrayed along a first side of said guideway, each of said contacts being electrically connected to said light source;

at least one electrical contact disposed on a second side of said guideway opposite said row of contacts; and a disk-shaped battery disposed within said guideway and adapted to roll back and forth along said guideway in response to said oscillatory movement of said body, said battery having first and second terminals on opposite ends thereof arranged to simultaneously engage said contacts on said first and second sides of said guideway as said battery rolls along said guideway to intermittently energize said light source.

* * * * *